(12) United States Patent
Reubens et al.

(10) Patent No.: US 11,486,451 B2
(45) Date of Patent: Nov. 1, 2022

(54) SLIP COUPLING FOR A WORK MACHINE

(71) Applicant: CNH Industrial America LLC, New Holland, PA (US)

(72) Inventors: Sam Reubens, Sint-Michiels (BE); Jean-Pierre Vandendriessche, Erpe-Mere (BE)

(73) Assignee: CNH Industrial America LLC, New Holland, PA (US)

( * ) Notice: Subject to any disclaimer, the term of this patent is extended or adjusted under 35 U.S.C. 154(b) by 230 days.

(21) Appl. No.: 16/492,754

(22) PCT Filed: Mar. 8, 2018

(86) PCT No.: PCT/EP2018/055837
§ 371 (c)(1),
(2) Date: Sep. 10, 2019

(87) PCT Pub. No.: WO2018/162683
PCT Pub. Date: Sep. 13, 2018

(65) Prior Publication Data
US 2020/0072297 A1  Mar. 5, 2020

(30) Foreign Application Priority Data

Mar. 10, 2017 (BE) .................................. 2017/5151

(51) Int. Cl.
*F16D 7/02* (2006.01)
*F16D 9/06* (2006.01)

(52) U.S. Cl.
CPC ............. *F16D 7/027* (2013.01); *F16D 9/06* (2013.01)

(58) Field of Classification Search
CPC .......... F16D 7/024; F16D 7/025; F16D 7/027; F16D 7/028; F16D 7/044; F16D 9/06
(Continued)

(56) References Cited

U.S. PATENT DOCUMENTS

| 1,039,125 A | * | 9/1912 | Hardy | ................. F16D 7/025 464/47 |
| 2,351,996 A | * | 6/1944 | Morgan | ............... F16D 41/22 192/54.5 |

(Continued)

FOREIGN PATENT DOCUMENTS

| DE | 3141353 A1 | * | 5/1983 | ............. F16D 7/025 |
| DE | 102014218090 B3 | * | 2/2016 | ............. F16D 7/044 |

(Continued)

OTHER PUBLICATIONS

International Search Report and Written Opinion for PCT application PCT/EP2018/055837, dated May 15, 2018 (10 pages).

*Primary Examiner* — Josh Skroupa
(74) *Attorney, Agent, or Firm* — Peter Zacharias; Patrick Sheldrake

(57) ABSTRACT

A slip coupling for a work machine includes a main clutch in the form of a friction-based and spring-operated slip clutch. The slip coupling further includes an auxiliary clutch configured to maintain a pre-set spring-induced clamping force on friction plates of the slip clutch, when the slip coupling rotates in a forward direction, and further configured to be able to increase the spring-induced clamping force, when the slip coupling rotates in a reverse rotational direction. The increase of the clamping force is enabled by the fact that one of two auxiliary clutch parts is axially movable when the slip coupling rotates in the reverse rotational direction, the axial movement actuating an increase in pre-tension of mechanical spring or springs of the slip clutch. A work machine such as a combine harvester equipped with the slip coupling is also described.

14 Claims, 3 Drawing Sheets

(58) Field of Classification Search
USPC .............. 464/32, 33, 43, 44, 46, 47, 48
See application file for complete search history.

(56) References Cited

U.S. PATENT DOCUMENTS

| | | | | |
|---|---|---|---|---|
| 2,446,363 A * | 8/1948 | Daum | .................. | B25B 23/141 |
| | | | | 192/48.5 |
| 3,252,553 A | 5/1966 | Peterson | | |
| 3,394,786 A | 7/1968 | Fink et al. | | |
| 3,942,337 A * | 3/1976 | Leonard | .................. | F16D 7/044 |
| | | | | 464/36 |
| 3,971,260 A | 7/1976 | Hobbs | | |
| 4,155,228 A | 5/1979 | Burgener, Jr. et al. | | |
| 4,373,358 A * | 2/1983 | Pearch | .................... | F16D 7/025 |
| | | | | 464/48 |
| 4,545,470 A * | 10/1985 | Grimm | ................. | F16D 43/213 |
| | | | | 464/46 |
| 4,624,650 A * | 11/1986 | Hiruma | .................... | F16D 3/14 |
| | | | | 464/46 |
| 4,645,472 A * | 2/1987 | Heidenreich | ........... | F16D 7/025 |
| | | | | 464/48 |
| 4,662,499 A * | 5/1987 | Jordan | .................... | F16D 7/027 |
| | | | | 192/82 T |
| 4,937,957 A * | 7/1990 | Umberson | ................. | E02F 3/20 |
| | | | | 192/113.34 |
| 5,038,904 A * | 8/1991 | Miller | ................. | F16D 25/0638 |
| | | | | 192/70.2 |
| 5,180,042 A | 1/1993 | Ogiso | | |
| 6,132,435 A * | 10/2000 | Young | ................. | A61B 17/8875 |
| | | | | 192/56.54 |
| 7,025,151 B2 * | 4/2006 | Hehli | ................. | A61B 17/8875 |
| | | | | 173/176 |
| 7,175,570 B2 * | 2/2007 | Lull | ........................ | F16D 7/025 |
| | | | | 482/57 |
| 7,475,619 B2 * | 1/2009 | Chiu | .................... | B25B 13/483 |
| | | | | 81/467 |
| 8,105,171 B2 * | 1/2012 | Murakami | .............. | F16D 7/027 |
| | | | | 464/46 |
| 9,238,481 B2 * | 1/2016 | Johnson | ................. | F16D 7/044 |
| 10,274,021 B2 * | 4/2019 | Victor | .................... | F16D 7/024 |
| 2005/0133330 A1 | 6/2005 | Stiefvater | | |
| 2009/0301836 A1 | 12/2009 | Murakami | | |
| 2012/0090942 A1 * | 4/2012 | Lawson | ................. | F16D 7/025 |
| | | | | 192/56.6 |

FOREIGN PATENT DOCUMENTS

| | | | | |
|---|---|---|---|---|
| EP | 1462670 A2 * | 9/2004 | ............ | F16D 7/044 |
| EP | 3078872 A1 | 10/2016 | | |
| EP | 3096036 A1 | 11/2016 | | |
| FR | 2901857 A1 | 12/2007 | | |
| JP | 2002340051 A | 11/2002 | | |

* cited by examiner

SLIP COUPLING FOR A WORK MACHINE

FIELD OF THE INVENTION

The present invention is related to work machines, primarily to agricultural machines such as combine harvesters or forage harvesters, in particular to a slip coupling for a driveline of the work machine.

BACKGROUND OF THE INVENTION

Most functional components on a work machine as well as their drivelines need a protection system in case of peak and blockage load conditions. When the driveline consists of rigid mechanical components like gearboxes and drive shafts, an integrated slip clutch is often used for mechanical protection. This component uses friction plates which are clamped together to create a safety torque setting. During overload the static friction between the plates is no longer sufficient to transfer the demanded torque, causing the plates to slip relative to each other. This system provides sufficient protection but it is limited to one clamping force resulting in one slip torque setting for the system. In case of a blockage, the inertia in the system following the clutch is able to block the driveline at a higher torque than set by the protection system. This can cause problems when trying to reverse the blocked driveline because the clutch will slip when trying to apply the required torque without the inertia effect. In order to unblock the system, the clamping force on the clutch plates when operating in the reverse direction would have to be higher than in the forward direction.

There are two ways of clamping the clutch plates together: mechanically or hydraulically. A hydraulic system is capable of providing the higher clamping force for unblocking the driveline by adjusting the pressure in the piston. This approach however requires a complex construction of the clamping system and hydraulic circuit, which makes it quite expensive. A mechanical slip clutch operates by axially locking up the plates with pre-tensioned mechanical springs. This is a less complex and less expensive system, but it is not flexible, i.e. it is not capable of adjusting the clamping force between the plates.

SUMMARY OF THE INVENTION

The present invention provides a slip coupling in accordance with the appended claims, that lacks the technical complexity of a hydraulic system while allowing to solve the above-described problem related to the required adjustable clamping force when deblocking a driveline in the reverse direction. The slip coupling comprises a main clutch, which is a friction-based and spring-operated slip clutch as described above and set to slip at a certain torque setting, and in addition to that, the slip coupling comprises an auxiliary clutch, preferably a jaw clutch, comprising a first and second part which are configured to rotatably engage, i.e. the first and second part are provided with mutually interacting features (interlocking teeth in the case of a jaw clutch) arranged to enable the simultaneous rotation of the first and second part. The auxiliary clutch is furthermore configured to maintain a pre-set spring-induced clamping force on the friction plates (corresponding to the torque setting) when the coupling rotates in a forward direction, and further configured to be able to increase the spring-induced clamping force, when the coupling rotates in the reverse rotational direction. The increase of the clamping force is enabled by the fact that one of the two auxiliary clutch parts is axially movable when the coupling rotates in the reverse rotational direction. The axial movement is initiated when the torque exceeds a given limit, lower than or equal to the torque setting of the slip clutch, and actuates an increase in the pre-tension of the mechanical spring or springs of the slip clutch. The other clutch part is axially stationary, preferably by being uniform with or attached to an axially stationary element of the first or second component. According to a preferred embodiment, one of the components comprises an axle and an axially stationary rotatable part that is rotatable about the axle, and wherein the axially stationary clutch part is uniform or attached to said rotatable part. The term 'uniform with or attached to' is to be understood in the sense that the two parts behave as a single body. A breakable connection between the two parts is however not excluded, such as a connection by shear bolts.

The invention provides a solution to the above-described problem, by enabling a higher clamping force on the friction plates of the slip clutch when the coupling is rotated in the reverse direction compared to the forward direction. This is achieved with a mechanically pre-tensioned friction clutch, i.e. without hydraulic or other technically complex solutions.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
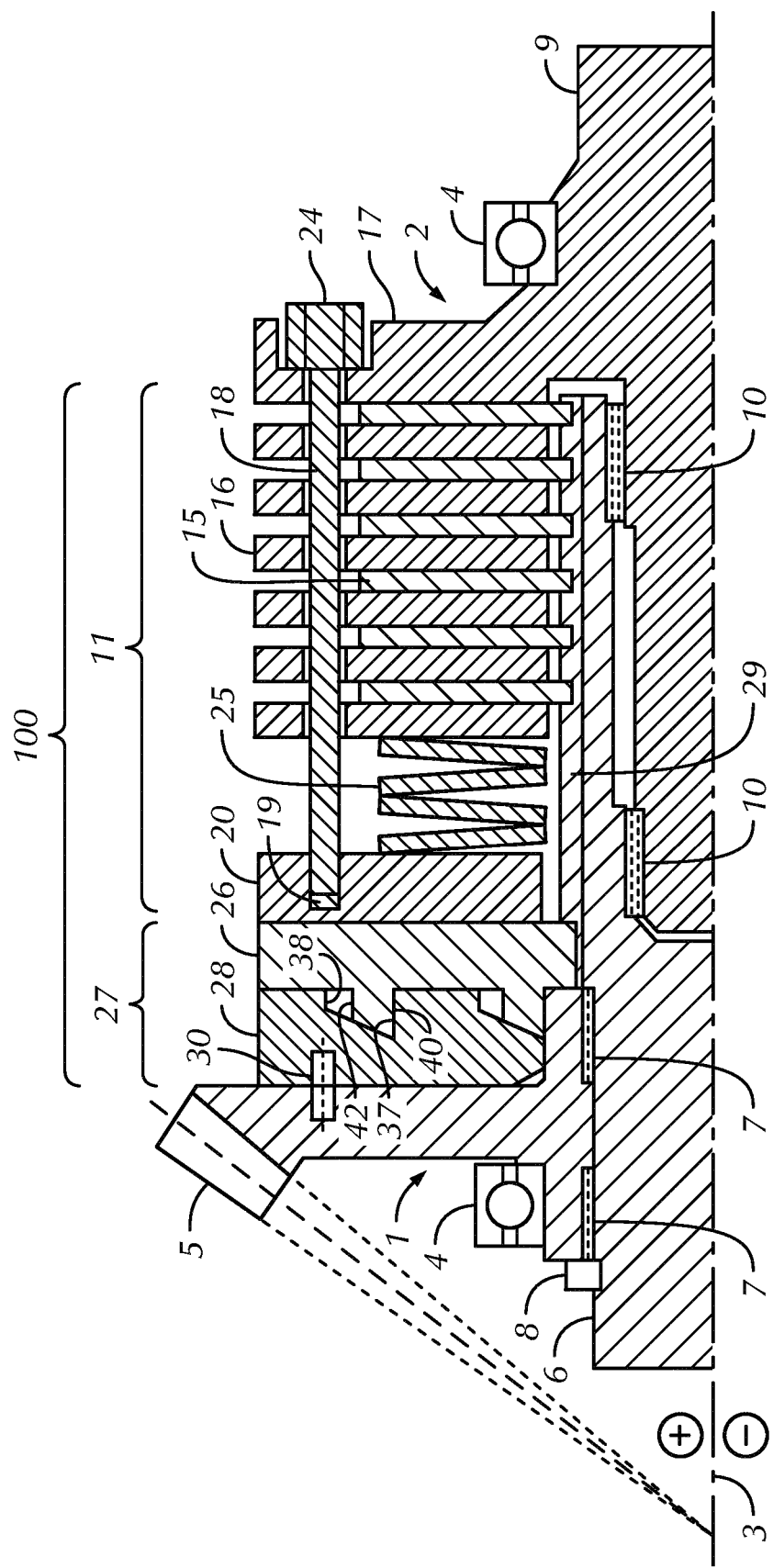
FIG. 1 is a side view of a slip coupling according to a first embodiment of the invention, in a condition that allows rotation in the forward direction.

FIG. 1 shows a slip coupling 100 according to a first embodiment. The coupling is configured to rotatably connect two components 1 and 2, for example two components of a driveline in a work machine such as a combine harvester. The assembly of the two components is rotatable about a central rotation axis 3. Only the portion above the axis 3 is shown, as the rotation axis is a symmetry axis in the illustrated side view. The assembly is mounted in a chassis (not shown) and is rotatable with respect to the chassis via a pair of roller bearings 4. Except when noted in the following description, the components are shown in cross-section with the plane of the drawing.

Component 1 comprises a rotatable element such as a gear wheel 5 mounted on an axle 6. A rotation of the gear wheel 5 with respect to the axle 6 is allowed through a set of slide bearings 7. Axial displacement of the gear wheel 5 is obstructed by a stop 8 and by a set of splines 29 (described further). Component 2 comprises an axle 9, which may be a drive axle of a work machine that is itself driven by a gear mechanism that includes the gear wheel 5. In other words, in operation, component 1 is the driving component and component 2 the driven component, i.e. the torque that actuates the rotation of the components is transferred through the coupling 100 from component 1 to component 2. Slide bearings 10 are mounted between the axles 6 and 9 of the two components, thereby allowing relative rotation of the components when the coupling slips, which happens above a given limit of the torque transferred from the first to the second component or vice versa. Below the torque limit, relative rotation of the first component 1 with respect to the second component 2 is prohibited.

The hatching of the various parts indicates which elements are part of or fixed to each of the components: forward hatched parts (//) are part of or fixed to component 1, while back-hatched parts (\\) are part of or fixed to component 2.

The torque limit value is determined by a friction clutch 11 comprising a plurality of packed friction plates 15 and 16. A first series of disc-shaped friction plates 15 is mounted on the axle 6 of the first component 1. Interspaced between the plates 15 of the first series is a second series of disc-shaped friction plates 16. The plates 16 of the second series are connected to a radial (preferably disc-shaped) extension 17 of the axle 9 of the second component 2, through a series of tension rods 18, which protrude in the axial direction through the radial extension 17 and through the friction plates 16 of the second series of plates. The tension rods 18 have threaded ends which engage with threaded holes 19 provided in an axially displaceable disc 20. A number of axial springs 25 (e.g. Belleville springs) are mounted between the package of friction plates 15/16 and the axially displaceable disc 20. The degree of engagement of the rods 18 into the threaded holes 19, controlled by the turning of nuts 24 attached to the opposite ends of the rods 18, determines the pre-tension of the springs 25 and thereby the clamping force exerted on the friction plates 15 and 16, which in turn defines the torque setting of the slip clutch 11, i.e. the torque value at which one set of friction plates slips with respect to the other.

On the side of the disc 20 opposite the holes 19, the disc 20 is in physical contact with a first part 26 of a specially designed jaw clutch 27. The first part 26 of the jaw clutch rotatably engages with a second part 28, i.e. the clutch parts have teeth-shaped elements which engage with each other to enable the simultaneous rotation of the two clutch parts 26 and 28. The parts of the jaw clutch are coaxial with the central axis 3 of the coupling. The hub of the first clutch part 26 engages with splines 29 on the axle 6 of the first component. The first clutch part 26 is thereby movable in the axial direction. The second clutch part 28 is uniform with or attached to the axially stationary gear wheel 5, for example through a set of axial pins 30. The second clutch part 28 is thus not axially moveable. The axial pins 30 may have the additional function of shear bolts, providing an additional safety in case of high torque and failure of the slip clutch 11. However as long as the slip clutch functions correctly, the pins 30 establish a fixed connection between the gear wheel 5 and the jaw clutch part 28, i.e. these parts behave as a single body.

The design of the jaw clutch 27 is special in the sense that the jaw clutch parts 26 and 28 are designed to rotatably engage with each other in the two rotational directions, but in such a way that engagement in one of the two directions enables a forced axial shift of the first clutch part 26 relative to the second clutch part 28.

Figure 2:
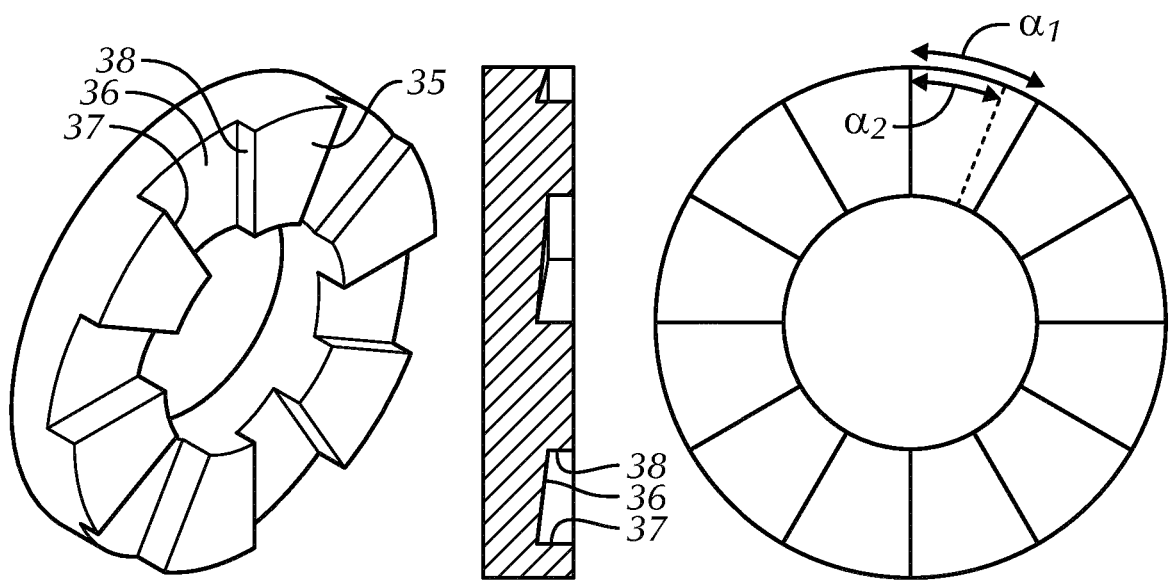
FIG. 2 shows several views of a clutch plate applicable in a slip coupling according to an embodiment of the invention.

This may be achieved by designing at least one of the clutch parts in the manner illustrated in FIG. 2. The part is produced as a round plate with a succession of teeth 35 and valleys 36 distributed along the circumference of the plate. The valleys are slanted with respect to a plane perpendicular to the rotation axis 3, the surface of the valleys changing gradually from a lower level at one sidewall 37 of a valley up to a higher level at the opposite sidewall 38 (the terms 'low' and 'high' being defined from the viewpoint of a location on the surface of the valleys 36). The valleys may be formed according to a helical surface defined with respect to the central axis 3. However, this is not a requirement. What counts is that the surface is slanted in a manner to force the axial shift. The teeth of the opposite clutch part (not shown in FIG. 2) preferably have a corresponding slanted surface so that a sliding of the surfaces with respect to each other is enabled. The teeth may however also have another shape as long as it allows the axial shift to be actuated.

Importantly, the teeth of the opposite jaw clutch part have an angular width that is smaller than the angular width of the slanted valleys of the clutch part shown in FIG. 2. This is illustrated in the plane view of the clutch part in FIG. 2. The angular width of the valleys of the clutch part shown in the drawing is $\alpha_1$, whereas the angular width of the teeth of the opposite clutch part is $\alpha_2$. Consequently, an angular displacement between the cutch parts over the angular width $\alpha_1-\alpha_2$ is possible. Because of the slanted surfaces however, this displacement is only possibly when it is accompanied by a relative axial shift of the clutch parts. In other words, the slanted surfaces push the clutch parts away from each other, as they undergo the relative rotation, provided of course that an axial displacement of one part relative to the other is possible.

The illustration of the clutch parts 26 and 28 in FIG. 1 is in fact not a cross-section of the jaw clutch 27 but it is a side view with the left-hand jaw clutch part 28 produced according to FIG. 2, i.e. having slanted valleys which engage with similarly slanted teeth of the right-hand clutch part 26, the slanted teeth having a smaller angular width than the slanted valleys of the left-hand part 28, as explained above (difference $\alpha_1-\alpha_2$). The drawing is somewhat simplified in that the slopes and the dimensions of the teeth and valleys are not drawn mathematically correct as in FIG. 2. In the situation shown in FIG. 1, it is seen that the teeth of the two clutch parts are interlocked along corresponding sidewalls 37 and 40, thereby enabling the rotation of the full assembly in the forward rotational direction, as illustrated by the symbols ⊙ and ⊕, and considering that component 1 is driving component 2. When applied to a drive axle of a work machine, the forward rotational direction is the direction in which the axle rotates during normal operation. While rotating in this forward rotational direction, the slip coupling operates as any normal slip coupling: the torque is transferred from the first component 1 to the second 2, unless said torque exceeds the torque setting of the slip clutch 11. Above this limit, the spring force exerted by the axial springs 25 is no longer capable of overcoming the friction force that unites the friction plates 15 and 16. The coupling slips, i.e. the first set of plates 15 starts to rotate with respect to the second 16 and the coupling is interrupted. When this happens, the disc 20 slides against the backside of the right-hand clutch part 26.

Figure 3:
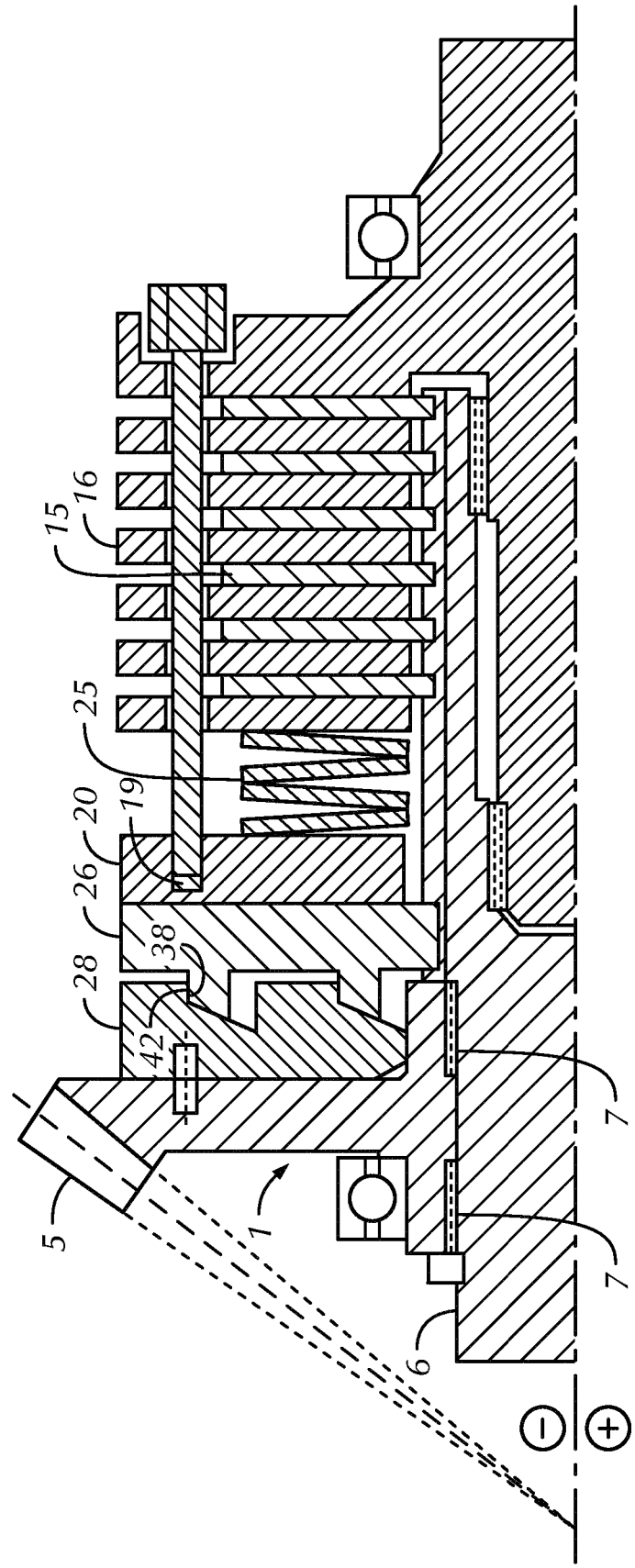
FIG. 3 is a side view of the same coupling shown in FIG. 1, now in a condition that allows rotation in the reverse direction.

When the assembly rotates in the reverse rotational direction, interlocking of the teeth of the jaw clutch parts along the sidewalls 38 and 42 is only possible when the jaw clutch parts 26 and 28 undergo a relative rotation as described above, in order to overcome the difference is angular width $\alpha_1-\alpha_2$. This angular rotation is enabled by the fact that the gear wheel 5 and the left-hand jaw clutch part 28 are rotatable with respect to the axle 6 of the first component, via the slide bearings 7. FIG. 3 shows the situation wherein the jaw clutch parts 26 and 28 are fully interlocked while the coupling rotates in the reverse direction. As the right-hand clutch part 26 is axially displaceable along the splines 29, this clutch part 26 has undergone a forced axial shift as a consequence of the rotational shift between the clutch parts, enabled by the slanted surfaces as described above. The axial displacement of the clutch part 26 has pushed the disc 20 and the tension rods 18 to the right, and has thereby increased the compression of the axial springs 25. In other words, the pre-tension by which the plates 15 and 16 of the friction clutch are clamped together is higher compared to the condition shown in FIG. 1. This means that when the coupling rotates in the reverse direction, the coupling does not slip at the same torque value but at a higher torque value. The torque setting for the slip coupling is different in the two rotational directions. This solves the problem described above, of requiring a higher pre-tension depending on the rotational direction, but it solves the problem without requiring a complex solution such as a hydraulic coupling.

When the coupling stops and rotation is again initiated in the forward rotational direction, the jaw clutch parts automatically move back to the situation of FIG. 1, through a relative rotation of the clutch parts 26 and 28, enabled by a rotation of the gear wheel 5 with respect to the axle 6, preferably taking place as soon as the gear wheel 5 is again actuated in the forward direction.

The rotational shift of the jaw clutch parts 26 and 28 relative to each other, and thereby the axial shift of the right-hand part 26 that increases the pre-tension of the springs 25 takes place when the transmitted torque in the reverse direction exceeds a given limit, lower than or equal to the original torque setting of the slip clutch 11 (i.e. the torque setting that applies when no additional pre-tension is applied to the springs 25). In this way, the axial shift of clutch part 26 takes place before the friction plates 15 and 16 are able to slip at the original torque setting. The value of the lower torque limit that generates the jaw clutch shift will depend on the precise design of the jaw clutch parts and in particular the slanted surfaces described above. When this lower torque limit value is set very low, the axial shift is likely to take place as soon as the reverse rotation of the coupling is started, especially when the torque increases quickly. When the value is higher, the axial shift will only take place during rotation in the reverse direction, when the (lower) torque limit is exceeded.

The coupling of FIG. 1 represents a preferred embodiment but the invention is not limited to this particular design. The basic characteristic is that the slip coupling according to the invention comprises a main clutch in the form of spring-operated slip clutch 11 and an auxiliary clutch configured so that in one of the two rotational directions, the parts of the auxiliary clutch may be forced apart in the axial direction. This forced axial movement of one of the auxiliary clutch parts actuates an increase in the pre-tension of the slip clutch, so that the slip clutch will slip at a higher torque value in one rotational direction compared to the other rotational direction. The actual design of the slip clutch may differ from the one shown in FIG. 1, for example in terms of the type of spring that is used or the number of friction plates. The auxiliary clutch may be a jaw clutch 27 as in the above-described embodiment. However, other systems may be used which have the same effect. For example, the parts of the auxiliary clutch may have threaded surfaces arranged coaxially with the central rotation axis 3, and which are mutually corresponding, i.e. one thread can be screwed into and out of the other. The threaded surfaces are configured to engage with each other to a maximum extent when the coupling rotates in the forward direction. For example, the axially movable right-hand clutch part (equivalent to 26 in FIG. 1) has an outer thread, screwed into an inner thread on the surface of the axially stationary left-hand part (equivalent to 28), to a given maximum extent, for example defined by a stop mechanism. In the reverse rotational direction, a rotation of the clutch parts relative to each other, enabled for example in the manner shown in FIG. 1, by making the gear wheel 5 rotatable about axle 6, forces an axial displacement of the right-hand part, i.e. the right-hand part is 'screwed out' of the left-hand part to a given degree, possibly limited by a further stop mechanism incorporated in the thread connection. The axial displacement has the same effect as described above, of increasing the pre-tension of the springs 25.

In the embodiment of FIG. 1, the auxiliary clutch 27 is located on the input side of the coupling, i.e. on the side of the driving component 1. The axially stationary clutch part 28 is uniform with or attached to a rotatable part (such as gear wheel 5) of the driving component 1. However, the coupling can also function if—with the same configuration as in FIG. 1—component 2 is used as the driving component and component 1 as the driven component, in which case the auxiliary clutch is located on the output side of the coupling. In this case, the forward and reverse directions are the opposite of the directions shown in FIGS. 1 and 3. In this respect, the scope of the terms 'first component' and 'second component', used in the appended claims, are not limited by the embodiment of FIGS. 1 and 3 with components 1 and 2 designated as first and second component respectively, nor to the designation of either component as 'driving' or 'driven'.

The connection between the axially moveable clutch part 26 and the axially displaceable disc 20 can be different than shown in FIG. 1. There could be elements mounted in between these parts, i.e. the clutch part 26 need not necessarily be in physical contact with the disc 20. What counts is that the clutch part 26 is configured to transfer its axial movement to the disc 20. The rotation of the clutch part 26 relative to the disc 20 may be facilitated by mounting an axial roller bearing between the two.

When the auxiliary clutch is a jaw clutch 27, the clutch parts may differ in terms of the precise shape of the slanted surfaces, the number of teeth and valleys etc., or the features that enable the relative rotation of the two jaw clutch parts 26/28 with respect to each other. The slanted valleys 36 may be on the movable jaw clutch part 26 instead of on the stationary part 28, or both parts may be provided with such slanted valleys.

Figures 4A, 4B:
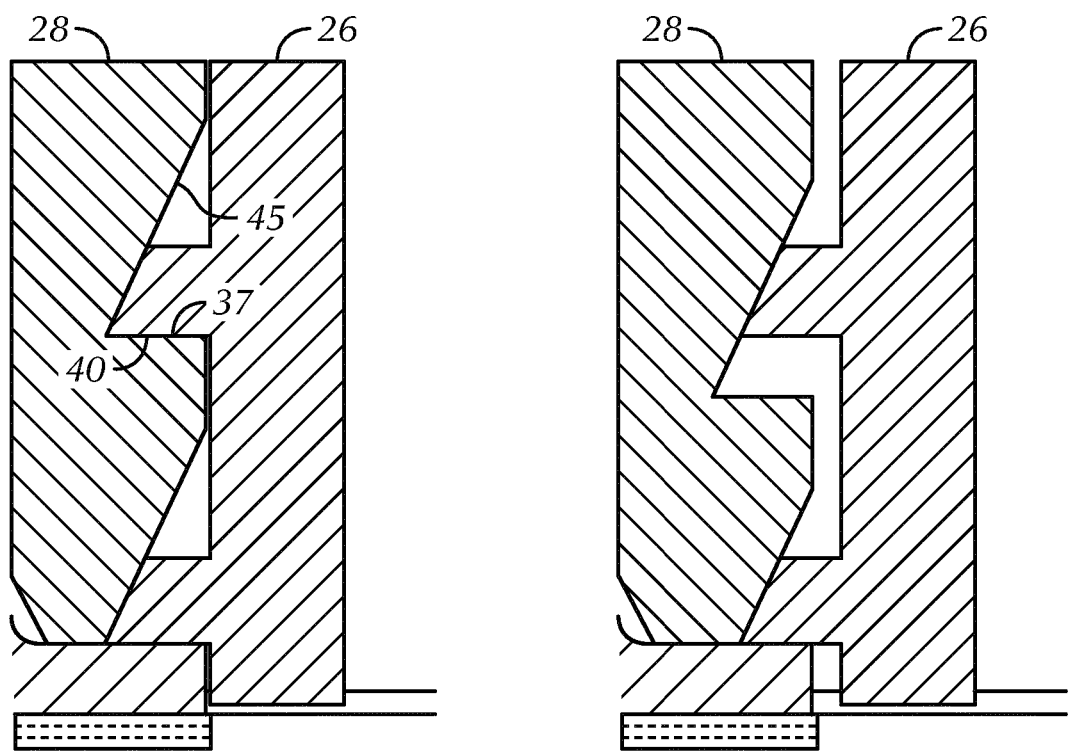
FIGS. 4a and 4b illustrate an alternative design of the jaw clutch that may be included in a slip coupling according to the invention.

The slanted valleys 36 may have one sidewall only instead of two. This is illustrated in FIG. 4. In the forward direction (FIG. 4a), the clutch parts interlock through direct contact between the side walls 37 and 40, as in the previous embodiment. In the reverse direction however (FIG. 4b), the jaw clutch parts can only engage along the slanted surfaces 45, without being able to interlock along straight walls of the interacting valleys and teeth. These slanted surfaces are then preferably designed in relation to the springs 25 in such a manner that the jaw clutch parts do not slip, i.e. the slanted surfaces 45 stay in contact with one set of teeth from the opposite clutch part and the friction plates 15/16 will slip before the clutch parts are pushed so far apart that the teeth of the right-hand part 26 pass beyond the slopes of the left-hand part 28.

The invention claimed is:

1. A slip coupling for rotatably connecting a first and second component of a work machine, the components being rotatable about a central rotation axis, the slip coupling comprising:

a main clutch in the form of a spring-operated slip clutch pre-tensioned by one or more mechanical springs; and
an auxiliary clutch comprising:
a plurality of axial tensioning rods;
an axially displaceable disc having threaded holes; and
a first and second clutch part configured to rotatably engage about the central rotation axis when the slip coupling rotates in a forward and reverse rotational direction, the first clutch part being axially movable and the second clutch part being axially stationary, wherein the first and second clutch parts are configured so that engagement of the clutch parts in the reverse direction enables an axial movement of the first clutch part with respect to the second clutch part, the axial movement acting to increase the pre-tension of the mechanical spring of the spring-operated slip clutch, wherein the spring-operated slip clutch comprises a package of friction plates comprising a first set of friction plates mounted on the first component and a second set of friction plates interspaced between the first set of friction plates, the second set of plates being connected to one or more radial extensions of the second component through the plurality of axial tensioning rods having threaded ends engaged in the threaded holes of the axially displaceable disc, wherein at least one axial spring is mounted between the axially displaceable disc and the package of friction plates so that a degree of engagement of the axial tensioning rods in the threaded holes determines a pre-tension of the at least one axial spring, and wherein the first clutch part is mounted relative to the axially displaceable disc in such a manner that an axial displacement of the first clutch part actuates the same axial displacement of the axially displaceable disc.

2. The slip coupling according to claim 1, wherein the auxiliary clutch is a jaw clutch and wherein:
the first and second parts of the jaw clutch have interacting teeth and valleys, each tooth of one clutch part interlocking with a first sidewall of a valley of the other part when the slip coupling rotates in the forward rotational direction,
wherein the surface of the valleys of at least one of the first and second clutch parts is slanted in a manner to actuate the axial movement as a consequence of a rotation of one clutch part relative to the other, when the slip coupling rotates in the reverse rotational direction.

3. The slip coupling according to claim 2, wherein the surface of the slanted valleys in at least one of the first and second clutch parts is delimited by the first sidewall that interlocks with the teeth of the other clutch part when the slip coupling rotates in the forward direction, and by a second sidewall, opposite the first sidewall, and wherein the axial movement is limited by the interlocking of the teeth of the other clutch part with the second sidewall of the slanted valleys, when the slip coupling rotates in the reverse direction.

4. The slip coupling according to claim 1, wherein the first and second clutch parts of the auxiliary clutch have mutually corresponding threaded surfaces which are coaxial with the central rotation axis.

5. A work machine equipped with a slip coupling according to claim 1.

6. The work machine according to claim 5, wherein the work machine is a combine harvester or a forage harvester.

7. A slip coupling rotatably connecting a first and second component of a work machine, the components being rotatable about a central rotation axis, the slip coupling comprising:
a main clutch in the form of a spring-operated slip clutch pre-tensioned by one or more mechanical springs, and
an auxiliary clutch comprising:
a plurality of axial tensioning rods; and
a first and second clutch part configured to rotatably engage about the central rotation axis when the slip coupling rotates in a forward and reverse rotational direction, the first clutch part being axially movable and the second clutch part being axially stationary, wherein the first and second clutch parts are configured so that engagement of the first and second clutch parts in the reverse direction enables an axial movement of the first clutch part with respect to the second part, the axial movement acting to increase the pre-tension of the mechanical spring of the spring-operated slip clutch, wherein the spring-operated slip clutch comprises a package of friction plates comprising a first set of friction plates mounted on the first component and a second set of friction plates interspaced between the first set of friction plates, the second set of plates being connected to one or more radial extensions of the second component through the plurality of axial tensioning rods, the tensioning rods have threaded ends engaged in threaded holes of an axially displaceable disc, wherein at least one axial spring is mounted between the axially displaceable disc and the package of friction plates so that the degree of engagement of the axial tensioning rods in the threaded holes determines a pre-tension of the spring, and wherein the first clutch part of the auxiliary clutch is mounted relative to the axially displaceable disc in such a manner that an axial displacement of the first clutch part actuates the same axial displacement of the disc.

8. The slip coupling according to claim 7, wherein the auxiliary clutch is a jaw clutch and wherein:
the first and second parts of the jaw clutch have interacting teeth and valleys, each tooth of one clutch part interlocking with a first sidewall of a valley of the other part when the slip coupling rotates in the forward rotational direction,
wherein the surface of the valleys of at least one of the first and second clutch parts is slanted in a manner to actuate the axial movement as a consequence of a rotation of one clutch part relative to the other, when the slip coupling rotates in the reverse rotational direction.

9. The slip coupling according to claim 8, wherein the surface of the slanted valleys in at least one of the first and second clutch parts is delimited by the first sidewall that interlocks with the teeth of the other clutch part when the slip coupling rotates in the forward direction, and by a second sidewall, opposite the first sidewall, and wherein the axial movement is limited by the interlocking of the teeth of the other clutch part with the second sidewall of the slanted valleys, when the slip coupling rotates in the reverse direction.

10. The slip coupling according to claim 7, wherein the axially stationary part of the auxiliary clutch is uniform with an axially stationary part of the first or second component.

11. The slip coupling according to claim 10, wherein the first or second component comprises a rotatable element and an axle, the rotatable element being itself rotatable with respect to the axle, and wherein the axially stationary part of the auxiliary clutch is uniform with or attached to the rotatable element.

12. The slip coupling according to claim 11, wherein the second clutch part is attached to the axially stationary part of the first or second component by a set of axial pins.

13. The slip coupling according to claim 12, wherein the axial pins are configured as shear bolts which provide a safety in case of failure of the slip clutch.

14. A slip coupling rotatably connecting a first and second component of a work machine, the components being rotatable about a central rotation axis, the slip coupling comprising:

a main clutch in the form of a spring-operated slip clutch pre-tensioned by one or more mechanical springs, and an auxiliary clutch comprising:
  a plurality of axial tensioning rods; and
  a first and second clutch part configured to rotatably engage about the central rotation axis when the slip coupling rotates in a forward and reverse rotational direction, the first clutch part being axially movable and the second clutch part being axially stationary, wherein the first and second clutch parts are configured so that engagement of the first and second clutch parts in the reverse direction enables an axial movement of the first clutch part with respect to the second clutch part, the axial movement acting to increase the pre-tension of the mechanical spring of the spring-operated slip clutch, wherein the spring-operated slip clutch comprises a package of friction plates comprising a first set of friction plates mounted on the first component and a second set of friction plates interspaced between the first set of friction plates, the second set of friction plates being connected to one or more radial extensions of the second component through the plurality of axial tensioning rods, wherein the first and second clutch parts of the auxiliary clutch have mutually corresponding threaded surfaces which are coaxial with the central rotation axis.

* * * * *